Feb. 26, 1957  J. V. GENUA  2,783,082
DRIVE IN THEATER RAINSHIELD
Filed June 7, 1954

INVENTOR.
JOSEPH V. GENUA
BY
H. G. Manning
ATTORNEY.

United States Patent Office 2,783,082
Patented Feb. 26, 1957

2,783,082

DRIVE IN THEATER RAINSHIELD

Joseph V. Genua, Waterbury, Conn.

Application June 7, 1954, Serial No. 434,787

3 Claims. (Cl. 296—95)

This invention relates to automotive vehicles, and more particularly to a rainshield of waterproof material adapted to be located upon the top of an automobile and to extend forwardly over the windshield for protecting it from rain which might interfere with the vision of a motion picture by the occupants of the car.

One object of the present invention is to provide a rainshield of the above nature, which may be quickly and conveniently mounted upon and removed from the top of the automobile, whenever desired.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

Figure 1:
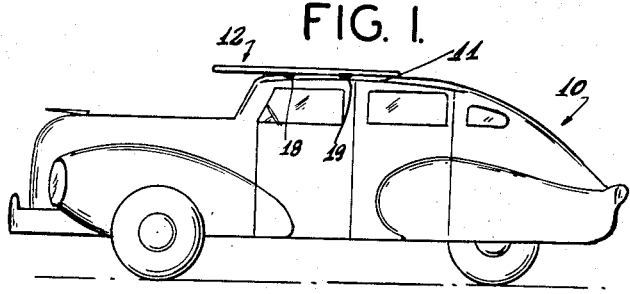
Fig. 1 represents a side elevational view of an automobile having the improved rainshield assembled in operating position.
Figure 2:
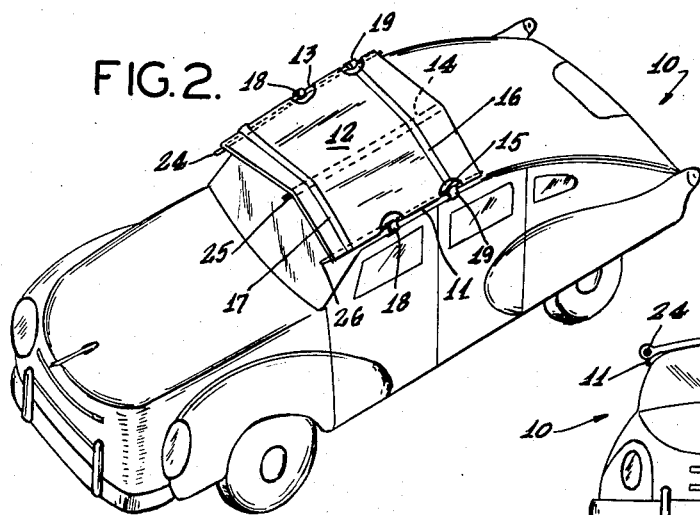
Fig. 2 is a perspective view of the same on a larger scale.
Figure 3:
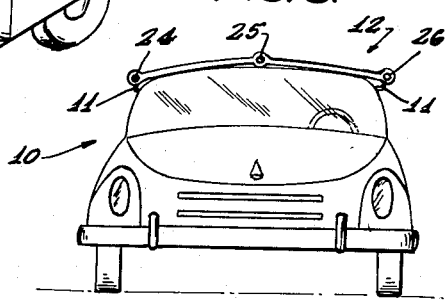
Fig. 3 is a front view of the same on a smaller scale.

Outdoor theatres of the drive-in type are subject to the disadvantage that in case of a rainstorm during the performance of a motion picture, the picture will be distorted by the rain impinging upon the front of the windshield of the car.

In view of the above, there is a great need for an inexpensive rainshield that can be easily attached to and removed from the top of the car and which will be easily collapsible for storage in the trunk of said car when not in use.

Referring now to the drawing in which like reference numerals denote corresponding parts throughout the several views, The numeral 10 indicates a standard type of automobile having a pair of side top gutters 11, as clearly shown in the drawing. The numeral 12 indicates a rectangular rainshield made of any suitable, waterproof material, such as plastic or fabric, and which is provided with three parallel, longitudinal spaced-apart rods 13, 14 and 15 enclosed within the waterproof material, and having their forward ends 24, 25, 26 extending to the front end of said waterproof material.

In order to hold the rainshield 12 securely in position upon the top of the automobile 10, provision is also made of a pair of transverse elastic webbings 16 and 17 which embrace the outside surfaces of said rainshield.

Provision is also made of two pairs of opposed S-shaped hooks 18, 19 which are adapted to be engaged over the convex gutters 11 at their bottom ends and have their top ends hooked over the rods 13 and 15 as clearly shown in the drawing.

In order to permit the assembly of the hooks to the rods and to the gutters, provision is made of four cut-out slots in the sides of the waterproof rainshield 12, as indicated by the numerals 20, 21, 22 and 23. The side edges of the rainshield sheet may thus be rolled around the outer rods 13, 15 for adjusting the rainshield to the width of the top of the windshield.

*Operation*

Figure 4:
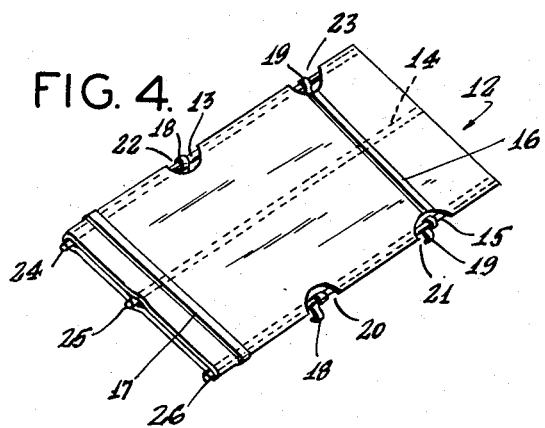
Fig. 4 is a perspective view of the rainshield shown detached from the automobile, in spread apart position.
Figure 5:
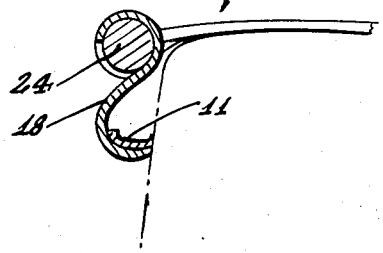
Fig. 5 is a fragmentary sectional view of one edge of the rainshield showing the locking hook engaged under the gutter at the top of the side of the automobile.

In operation, assuming that the rainshield is in collapsed position, it will merely be necessary to spread the outer rods 13 and 15 apart into the position shown in Fig. 4 and to engage the lower sections of the hooks 18 and 19 around the gutters 11 at the top of the car, and then slide the rainshield with its forward end extending over the front of the windshield.

While there has been disclosed in this specification one form in which the invention may be embodied, it is to be understood that this form is to be shown for the purpose of illustration only and that the invention is not to be limited to the specific disclosure, but may be modified and embodied in various other forms without departing from its spirit. In short, the invention includes all the modifications and embodiments coming within the scope of the following claims:

Having thus fully described the invention, what is claimed as new and for which it is desired to secure Letters Patent is:

1. In a rainshield for use upon an automobile at a drive-in theatre, a substantially rectangular sheet of flexible waterproof material having a width somewhat greater than the width of the top of the automobile, a pair of longitudinally extending outer rods one at each side of said sheet and embraced thereby, a rod secured to the center of said sheet and extending parallel to said outer rods, and hook members on each of said outer rods to connect said rods with the side gutters at the top of said automobile, said sheet having clip clearance slots adjacent said hooks to permit the insertion of said hooks between said rods and said sheet and to allow the side edges of said sheet to be rolled around said outer rods for adjusting said rainshield to the width of the top of said automobile, and a strip of transverse elastic webbing secured adjacent the rear of said rectangular sheet to hold it upon the top surface of the automobile and to hold said hooks in engagement with said side gutters and said outer rods.

2. A rainshield as defined in claim 1, in which said hook members comprise two pairs of S-shaped hooks provided to embrace said outer rods and said side gutters.

3. In a rainshield for use upon an automobile at a drive-in theater, a substantially rectangular sheet of flexible waterproof material having a width somewhat greater than the width of the top of the automobile windshield, a pair of longitudinally extending outer rods, one at each side of said sheet and embracd thereby, and hook members on each of said rods to connect them with the side gutters at the top of said automobile, said sheet having clip clearance slots in alignment with said hooks to permit the insertion of said hooks between said rods and said sheet, and to allow the side edges of said sheet to be rolled around said rods for adjusting said rainshield to the width of the top of said automobile windshield.

References Cited in the file of this patent

UNITED STATES PATENTS

| | | |
|---|---|---|
| 1,733,007 | Dahl | Oct. 22, 1929 |
| 2,231,293 | Norman | Feb. 11, 1941 |
| 2,306,537 | Hamm | Dec. 29, 1942 |
| 2,508,757 | Gray | May 23, 1950 |
| 2,549,662 | Carpenter | Apr. 17, 1951 |